United States Patent Office 3,600,388
Patented Aug. 17, 1971

3,600,388
QUINOXALINE-1,4-DIOXIDES
Walter Durckheimer, Hattersheim (Main), and Elmar Schrinner, Wiesbaden, Germany, assignors to Farbwerke Hoechst Aktiengesellschaft vormals Meister Lucius & Brüning, Frankfurt am Main, Germany
No Drawing. Filed July 7, 1969, Ser. No. 839,646
Claims priority, application Germany, July 25, 1968, P 17 70 975.0
Int. Cl. C07d 51/78
U.S. Cl. 260—250          6 Claims

ABSTRACT OF THE DISCLOSURE

New carboxylic acid hydrazides of the general formula

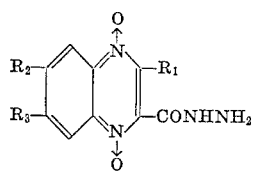

in which $R_1$ is lower alkyl, preferably methyl, and $R_2$ and $R_3$ represent hydrogen, lower alkyl or alkoxy, are prepared by reacting a compound of the formula

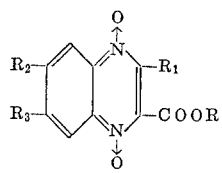

in which R is alkyl, with hydrazine hydrate under mild reaction conditions. The products of the invention have an antibacterial activity.

---

The present invention relates to new carboxylic acid hydrazides of the general Formula I

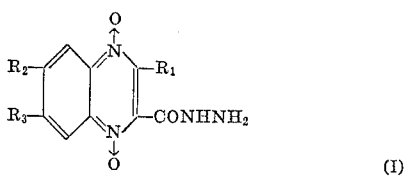

in which $R_1$ is lower alkyl, preferably methyl, and $R_2$ and $R_3$ represent hydrogen, lower alkyl or alkoxy, which compounds have an antibacterial action.

This invention relates, furthermore, to a process for the manufacture of said compounds which comprises reacting a compound of the Formula II

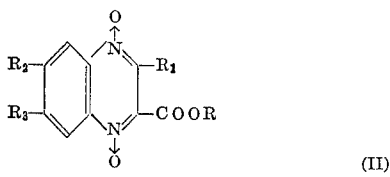

in which R is alkyl or aryl, with hydrazine hydrate under mild reaction conditions.

All attempts hitherto made to prepare 2-hydrazinocarbonyl-3-alkyl-quinoxaline-1,4-dioxides have not been successful since the ester group of a quinoxaline-1,4-dioxide having two vicinal substituents is very slow to react and an excess of hydrazine causes partial or entire reduction of the N-oxide groups. For example, according to J. K. Landquist and J. A. Silk (J. Chem. Soc. 1956, p. 2052), the reaction of ethoxycarbonyl-3-methyl-quinoxaline-1,4-dioxide with a 70% hydrazine hydrate exclusively yields 2-hydrazinocarbonyl - 3 - methyl-quinoxaline-4-monoxide which has no antibacterial action.

The present invention is based on the observation that, in a reaction of this type, the reduction of the N-oxide groups can be avoided by carrying out the reaction under mild conditions at temperatures of from 0° to 60° C., preferably at room temperature, in a solvent from which the carboxylic acid hydrazide of the quinoxaline-1,4-dioxide precipitates rapidly. Suitable solvents for this purpose are polar solvents, preferably methanol or ethanol.

The reaction is preferably carried out in such a manner that an ester of the Formula II is dissolved in the smallest possible amount of alcohol at room temperature or at slightly elevated temperature and the solution is stirred with an excess of hydrazine hydrate. After a short time, the hydrazide begins to precipitate in fine needles which are quickly separated from the reaction mixture. The separation may be completed by cooling and adding an non-dolar solvent, such as ether. The crude product contains, as an impurity, small amounts of starting material which are eliminated by washing with ethyl acetate or by recrystallisation from a polar solvent, preferably water, methanol or ethanol.

The esters of the quinoxaline-1,4-dioxides used as starting materials may be obtained by oxidation of the correspondingly substituted quinoxalines according to the method of Landquist and Silk mentioned above or by the reaction of benzofuroxanes with β-enamine-carboxylic acid esters according to M. J. Haddadin and C. H. Isidorides [Tetrahedron Letters No. 36, p. 3256 (1965)] and L. Marchetti and G. Tosi [Ann. Chim. 57, p. 1414 (1967)].

The compounds of the invention are valuable chemotherapeutics especially useful for combating bacterial infections.

They are distinguished by a high activity against gram-negative germs. Mice infected, for example, with Pasteurellae, Salmonellae and *Escherichia coli* bacteria can be cured by oral or parenteral application of subtoxic doses of the compounds. Moreover, the compounds of the invention have the valuable property of creating a long-lasting urine level and, therefore, are suitable for treating infections of the urinary tract. For example, colipyelonephritis, which is otherwise difficult to influence even by means of broad-spectrum antibiotics such as chloramphenicol and ampicilline, can be successfully treated with the compounds.

The superior properties of the compounds of the invention were established by comparing 2-hydrazinocarbonyl-3-methyl-quinoxaline-1,4-dioxide with the 2-hydrazino-carbonyl-quinoxaline - 1,4 - dioxide known from Netherlands patent application No. 6504563.

2-hydrazinocarbonyl-3-methyl - quinoxaline-1,4-dioxide (Preparation 1) dissolves easily in water (more than 50 at 24° C.) and can be administered orally and parenterally, whereas the other preparation can only be administered orally because of its poor solubility in water (less than 5 g./l. at 24° C.).

First the minimum inhibition concentrations of the two preparations against *Escherichia coli* were ascertained in a serial dilution test at 7.8 γ/ml. each. The preparations were then administered orally to dogs in order to determine the excretion with the urine, and the antibacterial activity in the urine was measured at fixed time intervals. For this purpose, the animals were catheterized prior to the beginning of the test and 30 minutes, 1 hour, 2 hours, 4 hours and 6 hours after administration. From the sixth to the 24th hour the dogs were kept in boxes permitting control of the metabolism. To determine the 24-hour value the dogs were once more catheterized. The urine obtained in this manner was filtered under sterile conditions and examined in a serial dilution test for its bacteriostatic activity against the test strain *Escherichia coli* 055.

The following Tables 1 and 2 show the values obtained in several tests. A urine level of less than 15.6 γ/ml. means that, under the test conditions, the urine has no bacteriostatic activity.

The test demonstrates that only the compounds of the invention having a lower alkyl radical in o-position to the hydrazide group bring about a high and long-lasting urine level necessary for therapeutic use against infections of the urinary tract.

TABLE 1

[Urine level after oral administration of a single dose of 5 mg. of active substance per kg. of body weight (in γ/ml. of urine]

| Preparation | Dog | After 0.5 | Hours 1 | 2 | 4 | 6 | 24 |
|---|---|---|---|---|---|---|---|
| 1 | 1 | 124.8 | 124.8 | 249.6 | 124.8 | 124.8 | 31.2 |
|   | 2 | 249.6 | 124.8 | 499.2 | 998.2 | 998.4 | 62.4 |
| 2 | 3 | <15.6 | <15.6 | <15.6 | <15.6 | <15.6 | <15.6 |
|   | 4 | <15.6 | 62.4 | 31.2 | <15.6 | <15.6 | <15.6 |

TABLE 2

[Urine level after oral administration of a single dose of 20 mg. of each substance per kg. of body weight (in γ/ml. of urine]

| Preparation | Dog | After 0.5 | Hours 1 | 2 | 4 | 6 | 24 |
|---|---|---|---|---|---|---|---|
| 1 | 5 | 1,996.8 | 1,996.8 | 3,993.6 | 3,993.6 | 1,996.8 | 31.2 |
| 2 | 6 | 124.8 | 249.6 | 124.8 | <15.6 | <15.6 | <15.6 |

The compounds of the invention are intended for the manufacture of orally and parenterally administerable preparations suitable for the treatment of bacterial infections in mammals.

As pharmaceutical preparations there may be mentioned, by way of example, tablets, dragées, capsules and solutions which may contain, in addition to the active ingredients of the invention, suitable adjuvants and carriers. It is also possible to use the products of the invention in admixture or conjunciton with other chemotherapeutics. The dosage unit is to be adapted to the compound used as active ingredient and to the desired effect.

The following examples serve to illustrate the invention.

EXAMPLE 1

2-hydrazinocarbonyl-3-methyl-quinoxaline-1,4-dioxide

A solution of 24.8 g. (0.1 mol) of 2-ethoxycarbonyl-3-methyl-quinoxaline-1,4-dioxide and 100 cc. of a 80%-hydrazine hydrate in 500 cc. of ethanol were stirred for 2 hours at room temperature. 2-hydrazinocarbonyl-3-methyl-quinoxaline-1,4-dioxide precipitated quickly in fine yellowish needles. The precipitate was suction-filtered, carefully washed with ethanol and ether and dried in vacuo over concentrated sulphuric acid. The yield was 15.6 g. (=65.5% of the theory), the decomposition point was 212–214° C. The mother liquor contained a mixture of 2-hydrazinocarbonyl-3-methyl-quinoxalline-1,4-dioxide, 2-hydrazinocarbonyl-3-methyl-quinoaxline-monoxide and starting material.

$C_{10}H_{10}N_4O_3$ (molecular weight: 234.2). Calculated (percent): C, 51.28; H, 4.30; N, 23.92. Found (percent): C, 50.6; H, 4.3; N, 24.0.

EXAMPLE 2

2-hydrazinocarbonyl-3-methyl-quinoxaline-1,4-dioxide

A solution of 24.8 g. of 2-ethoxycarbonyl-3-methyl-quinoxaline-1,4-dioxide and 83 cc. of a 80%-hydrazine hydrate in 500 cc. of ethanol was stirred at room temperature. The reaction was interrupted after 1, 2, 3 and 5 hours and the crystalline precipitate was separated, carefully washed with ethanol and ether and dried in vacuo over concentrated sulphuric acid. A total yield of 17.4 g. (=74.3% of the theory) of 2-hydrazinocarbonyl-3-methyl-quinoxaline-1,4-dioxide, decomposition point 212° C., was obtained.

$C_{10}H_{10}N_4O_3$ (molecular weight: 234.2). Calculated (percent): C, 51.28; H, 4.30; N, 23.92. Found (percent): C, 50.9; H, 4.2; N, 24.9.

EXAMPLE 3

2-hydrazinocarbonyl-3-methyl-7-methoxy-quinoxaline-1,4-dioxide

A solution of 27.8 g. (0.1 mol) of 2-ethoxycarbonyl-3-methyl-7-methoxy-quinoxaline-1,4-dioxide and 100 cc. of a 80%-hydrazine hydrate in 1.2 l. of ethanol was stirred for 6 hours at room temperature. The precipitate (19 g.) was suction-filtered and stirred twice with about 400 cc. of ethyl acetate to eliminate adhering starting material. 8 g. of starting material were recovered. The residue (9 g.=47.7% of the theory) consisted of pure 2-hydrazinocarbonyl - 3 - methyl-7-methoxy-quinoxaline-1,4-dioxide having a decomposition point of 160° C.

$C_{11}H_{12}N_4O_4$ (molecular weight: 264.25). Calculated (percent): C, 50.00; H, 4.58; N, 21.20. Found (percent): C, 49.7; H, 4.7; N, 20.9.

EXAMPLE 4

2-hydrazinocarbonyl-3-methyl-7-ethoxy-quinoxaline-1,4-dioxide

A solution of 14.6 g. (0.5 mol) of 2-ethoxycarbonyl-3-methyl-7-ethoxy-quinoxaline-1,4-dioxide and 44 cc. of a 80%-hydrazine hydrate in 440 cc. of ethanol was stirred at 38–40° C. for about 8 hours. The precipitate was suction-filtered and ether was added to the mother liquor until it became turbid. The mixture was then cooled. The combined precipitates were stirred with a small amount of ethanol, suction-filtered and dried over concentrated sulphuric acid. 4.7 g. (34% of the theory) of 2-hydrazinocarbonyl - 3 - methyl - 7 - ethoxy-quinoxaline-1,4-dioxide having a decomposition point of 227° C. were obtained.

$C_{12}H_{14}N_4O_4$ (molecular weight: 278.3). Calculated (percent): C, 51.80; H, 5.07; N, 20.14. Found (percent): C, 51.6; H, 5.0; N, 19.9.

EXAMPLE 5

2-hydrazinocarbonyl-3,7-dimethyl-quinoxaline-1,4-dioxide

A solution of 13.1 g. (0.05 mol) of 2-ethoxycarbonyl-3,7-dimethyl-quinoxaline-1,4-dioxide and 50 cc. of a 80%-hydrazine hydrate in 360 cc. of ethanol was stirred at room temperature for about 6 hours. The precipitate was suction-filtered and carefully washed with ethanol and ether. 3.9 g. (31.5% of the theory) of 2-hydrazinocarbonyl - 3,7 - dimethyl-quinoxaline-1,4-dioxide having a decomposition point of 198° C. were obtained.

$C_{11}H_{12}N_4O_3$ (molecular weight: 284.2). Calculated (percent): C, 53.21; H, 4.88; N, 22.57. Found (percent): C, 53.2; H, 4.9; N, 22.5.

EXAMPLE 6

2-hydrazinocarbonyl-3,6,7-trimethyl-quinoxaline 1,4-dioxide 27.6 g. (0.1 mol) of 2-ethoxycarbonyl-3,6,7-trimethyl-quinoxaline-1,4-dioxide were dissolved in 500 cc. of ethanol at about 55° C., 100 cc. of a 80%-hydrazine hydrate were added and the solution was allowed to cool slowly while stirred. After about 1 hour a precipitate began to separate which was suction-filtered after another 3 hours and washed with alcohol and ether. 16 g. (61% of the theory) of 2-hydrazinocarbonyl-3,6,7-trimethyl-quinoxaline-1,4-dioxide having a decomposition point of 230° C. were obtained.

$C_{12}H_{14}N_4O_3$ (molecular weight: 262.3). Calculated (percent): C, 54.95; H, 5.38; N, 21.36. Found (percent): C, 55.2; H, 5.6; N, 21.0.

We claim:

1. A quinoxaline-1,4-dioxide of the formula

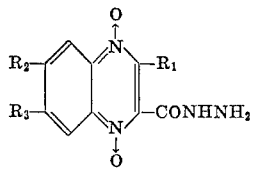

wherein $R_1$ is lower alkyl and $R_2$ and $R_3$ are each hydrogen, lower alkyl or lower alkoxy.

2. 2-hydrazinocarbonyl - 3 - methyl - quinoxaline-1,4-dioxide.

3. 2-hydrazinocarbonyl - 3 - methyl-7-methoxy-quinoxaline-1,4-dioxide.

4. 2 - hydrazinocarbonyl - 3 - methyl-7-ethoxy-quinoxaline-1,4-dioxide.

5. 2-hydrazinocarbonyl - 3,7 - dimethyl - quinoxaline-1,4-dioxide.

6. 2-hydrazinocarbonyl - 3,6,7 - trimethyl-quinoxaline-1,4-dioxide.

References Cited

UNITED STATES PATENTS 3,300,494  1/1967  Cragoe _____ 260—250

FOREIGN PATENTS

6504563  Netherlands _____ 260—250

OTHER REFERENCES

Lanquist et al.: J. Chem. Soc. (London), 1956, pp. 2052–2058.

NICHOLAS S. RIZZO, Primary Examiner

U.S. Cl. X.R.

424—250